(12) United States Patent
Wilson, Sr. et al.

(10) Patent No.: US 6,315,622 B1
(45) Date of Patent: Nov. 13, 2001

(54) AMPHIBIOUS VEHICLE CHASSIS

(75) Inventors: John Michael Wilson, Sr., Gretna; Dean Randall Wilson, Marrero; Paul Kevin Wilson, Westwego, all of LA (US)

(73) Assignee: Wilco Marsh Buggies & Draglines, Inc., Marrero, LA (US)

( * ) Notice: Subject to any disclaimer, the term of this patent is extended or adjusted under 35 U.S.C. 154(b) by 0 days.

(21) Appl. No.: 09/652,433

(22) Filed: Aug. 31, 2000

(51) Int. Cl.$^7$ ........................................ B60F 3/00
(52) U.S. Cl. ........................................ 440/12.5; 180/9.62
(58) Field of Search ................... 114/356, 61.1; 440/12.5, 12.63, 12.64; 180/9.62, 6.48, 305, 307, 308

(56) References Cited

U.S. PATENT DOCUMENTS

| | | | |
|---|---|---|---|
| 4,961,395 | * 10/1990 | Coast | 440/12.64 |
| 5,511,508 | 4/1996 | Wilson, Sr. et al. | 114/356 |
| 5,740,875 | 4/1998 | Wilson, Sr. et al. | 180/9.62 |

* cited by examiner

*Primary Examiner*—Jesus D. Sotelo
(74) *Attorney, Agent, or Firm*—Conley, Rose & Tayon, P.C.

(57) ABSTRACT

The chassis connects adjacent flotation members each having supports projecting therefrom for attaching to the chassis. The chassis includes a pair of beams having opposite ends and sides with an end flange affixed to the ends of the beams. A plate is affixed to one of the opposite sides of the beams and has a length greater than the beams to form extension surfaces at each end. The extension surfaces are connected to the supports on a first plane and the end flanges are connected to the supports on another plane, preferably perpendicular to the first plane and vertical to the ground. The beams are preferably I-beams having a web and opposing extending sides perpendicular to the web. The top side is longer than the web and other side so as to form a tine which is received in a recess in the end flanges. Further, preferably the end flanges project beyond the end flanges and the opposing sides of the I-beam to form a border area having a plurality of apertures adapted to receive fasteners, such as nuts and bolts. The extension surfaces also include a plurality of apertures adapted to receive fasteners.

27 Claims, 4 Drawing Sheets

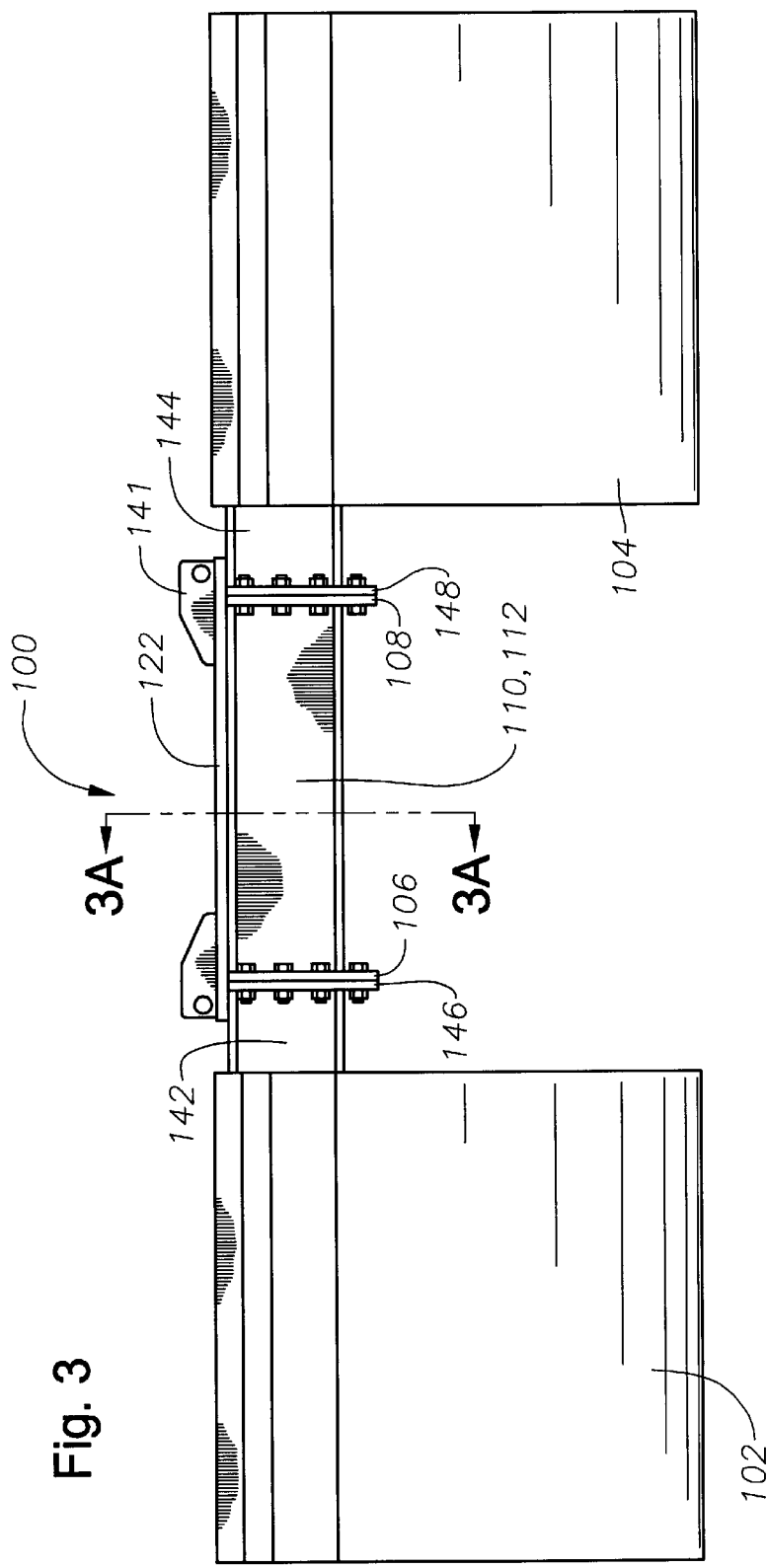
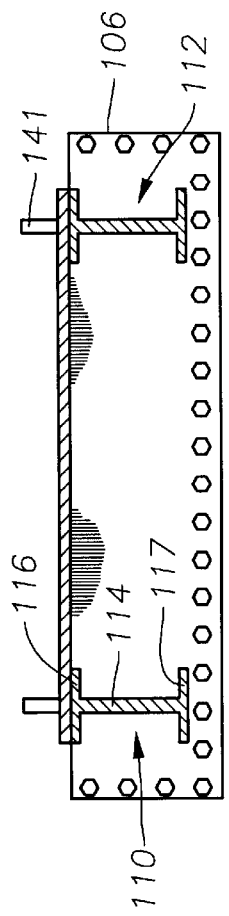
Fig. 3
Fig. 3A

AMPHIBIOUS VEHICLE CHASSIS

BACKGROUND OF THE INVENTION

The present invention relates generally to a chassis for an amphibious vehicle, and more particularly, to an amphibious vehicle chassis which connects adjacent pontoons so as to more effectively distribute the forces between the chassis and the pontoons thereby alleviating the sheer stress on the fasteners used to attach the pontoons to the chassis and providing added strength to the chassis connections.

Amphibious vehicles were first developed over 50 years ago primarily to support oil and gas exploration operations conducted in marshy or swampy terrain. Such vehicles typically include a pair of pontoons connected to a center platform. The pontoons are usually surrounded by a cleated track system which is capable of engaging ground, water, or swamp land to propel the vehicle. One or more endless chains are preferably driven by a sprocket, or other means, and surround each pontoon. The endless chains support the cleated tracks and are guided along the outer surface of the pontoon by guide channels. The cleated tracks are driven about the periphery of the pontoons in order to provide a thrust to the vehicle. By varying the amount and direction of thrust, or track travel, applied to each pontoon, the vehicle can be advanced, turned, or reversed.

Referring to FIG. 1, there is shown a tracked amphibious marsh vehicle 10. Marsh vehicle 10 includes a pair of pontoons 16, 18 forming a platform 15 to support a machinery 12 thereon. Machinery 12 can be selected from a wide assortment of heavy equipment but is shown in FIG. 1 as a boom crane. Pontoons 16, 18 are preferably constructed from steel or aluminum as rigid hollow structures or enclosures to provide sufficient buoyancy or "flotation" in amphibious environments to stabilize and support machinery 12 even on marshy or swampy terrain. Vehicle 10 also includes a lower drive train 14 with a driven endless track 20, 22 mounted around each of the pontoons 16, 18, respectively. A drive system (not shown) is used to independently rotate endless tracks 20, 22 about their respective pontoons 16, 18. The rotation of endless tracks 20, 22 is the primary method of positioning and guiding marsh vehicle 10. By varying the speed and direction of each track 20, 22, vehicle 10 is able to advance, change course, or reverse.

Over the years, improvements in the structure and integrity of pontoons allow these vehicles to work in more difficult terrain and operating environments. The pontoons are typically constructed of steel or aluminum alloys, are capable of flotation, and are useful for most situations where an amphibious vehicle is required. The pontoons are primarily for the purpose of supporting the deck or platform upon which the heavy machinery is mounted.

The platform and pontoons are connected and held together by a chassis. A typical chassis, along with the platform, is used to support or mount the heavy equipment, including but not limited to, excavators and personnel platforms. A vulnerable aspect of typical amphibious marsh vehicles is the durability of their chassis. The chassis is located between the pontoons and links the pontoons to the platform.

Referring now to FIG. 2, there is shown a typical prior art chassis 30. Prior art chassis 30 includes a central member 32 connecting two pontoons 34, 36 on either side thereof through two sets of flange plates 38, 40 and 42, 44 with a plurality of threaded fasteners 46. Central member 32 is constructed as a structural beam 48 with a support plate 50 welded thereupon and flanges 38, 42 at opposite ends. Pontoons 34, 36 each are constructed as hollowed steel or aluminum enclosures 52, 54 and are welded to extension members 56, 58. Extension members 56, 58 are thus welded to flanges 40, 44 which are in turn flanged up with flanges 38, 42 and bolted together by fasteners 46.

When an equipment module is placed on chassis 30, a normal force of large magnitude is applied to chassis 30 in direction W, generally perpendicular to the ground. Pontoons 34, 36 provide opposite loads and opposite bending moments P1 and P2, respectively, on the chassis 30. Ideally, when fasteners 46 are secured, force W and bending moments P1, P2 place the top fasteners, as for example fastener 46A, in compression and place the bottom fasteners, as for example fastener 46B, in tension. Under such tensile and compressive conditions, fasteners 46 must be robust.

However, when fasteners 46 are not properly secured or become loosened, shear stresses act generally along shear planes E and F causing adjacent flanges 38, 40 and 42, 44 to move in shear. Threaded fasteners, preferably in the form of bolts with corresponding nuts, are generally much stronger in tension and compression than they are in shear. Loosened fasteners 46 in prior art chassis designs can experience severe shear loads and are highly likely to fail in service. Such loosening of fasteners 46 can be the result of vibration or fatigue loading conditions. These loading conditions are highly prevalent in marsh vehicle environments and must be accommodated to prevent failure in service.

Because of the weight of the heavy equipment and the buoyant forces of the pontoons, the chassis undergoes tremendous forces. The vibratory forces and fatigue forces from the operation of the vehicle itself, the movement in the rugged terrain, the forces caused by the operation of the heavy equipment, such as an excavator, and the movement of the pontoons due to their buoyancy, prevent the long term durability of these vehicles.

Recently, demand in the industry is growing for vehicles that can perform even more rugged tasks with even heavier equipment, making larger marsh vehicles with higher load carrying capabilities necessary. Additionally, the terrain, wherein these amphibious vehicles are deployed, continues to get more and more treacherous as locations become more remote. Combined, the increase in size and the difficult terrain, mandates that the structural integrity of the vehicles meets rigorous, exacting standards. The remote locations where such vehicles are deployed also prohibits much routine and preventative maintenance. Therefore, there is a need for vehicles that can carry out operations in more remote locales and which require less maintenance.

The typical chassis is not designed to withstand these rigors and, consequently, tends to fail under such conditions. Particularly, it often occurs that the bolts that hold the vehicle chassis together, become loosened through the vibratory and fatigue loads that the chassis experiences. When chassis bolts become loose, failures in the chassis occur, pontoons become disconnected, requiring expensive and time consuming field repair operations. There is a need among the amphibious vehicle industry for a chassis that reduces or eliminates such failures. With a more robust chassis, larger amphibious vehicles with heavier equipment can be deployed in marshy regions, thus reducing the amount of time and resources required to perform many operations, such as construction or demolition, in rugged terrain and difficult environments.

The present invention overcomes the deficiencies of the prior art.

SUMMARY OF THE INVENTION

In accordance with the present invention, the chassis connects adjacent flotation members. Each of the flotation members have supports projecting therefrom for attaching to the chassis. The chassis includes a pair of beams having opposite ends and sides with an end flange affixed to the ends of the beams. A plate is affixed to one of the opposite sides of the beams and has a length greater than the beams to form extension surfaces. The extension surfaces are connected to the supports on a first plane and the end flanges are connected to the supports on another plane, preferably perpendicular to the first plane and vertical to the ground. The beams are preferably I-beams having a web and opposing extending sides perpendicular to the web. The top side is longer than the web and other side so as to form a tine which is received in a recess in the end flanges. Further, preferably the end flanges project beyond the end flanges and the opposing sides of the I-beam to form a border area having a plurality of apertures adapted to receive fasteners, such as nuts and bolts. The extension surfaces also include a plurality of apertures adapted to receive fasteners.

The supports on the flotation members preferably each include a pair of I-beams to which a mating flange is affixed. Like the chassis, the top side of the I-beam is longer so as to form a tine which is received in a notch in the top of the mating flange. A support brace preferably extends between the pair of I-beams adjacent the mating flange and may include mounting braces attached to the mating flange for additional support. The support brace includes apertures adapted for alignment with the apertures on the extension surfaces, and the mating flange includes apertures adapted for alignment with the apertures in the end flanges of the chassis.

The amphibious vehicle chassis of the present invention overcomes the shortcomings of the prior art and is capable of supporting and transferring large loads, even after fasteners for key structural components have loosened through vibratory or fatigue failure. By reinforcing the flange connection, the chassis reduces the possibility that the vehicle will experience a failure if one or more of the threaded fasteners becomes loose or breaks during operation. In making the vehicle chassises more robust, heavier equipment can be deployed on amphibious vehicles in more remote locations with a reduced amount of expensive and resource consuming support equipment.

The chassis reduces the occurrence of such failures by incorporating a fastener that is resistive to vibrations or fatigue loosening of the connections. Further, the chassis prevents failures by constructing the chassis in such a way that it is capable of remaining in service even after one or more fasteners become loose thus providing a more robust chassis and load resistant fasteners.

Other objects and advantages of the invention will appear from the following description.

BRIEF DESCRIPTION OF THE DRAWINGS

For a detailed description of a preferred embodiment of the invention, reference will now be made to the accompanying drawings wherein:

FIG. 3 is a schematic front view of a chassis in accordance with a preferred embodiment of the present invention for an amphibious vehicle such as shown in FIG. 1;

FIG. 3A is a cross-sectional view of the chassis taken at plane 3A—3A in FIG. 3;

DESCRIPTION OF THE PREFERRED EMBODIMENTS

Figure 1:
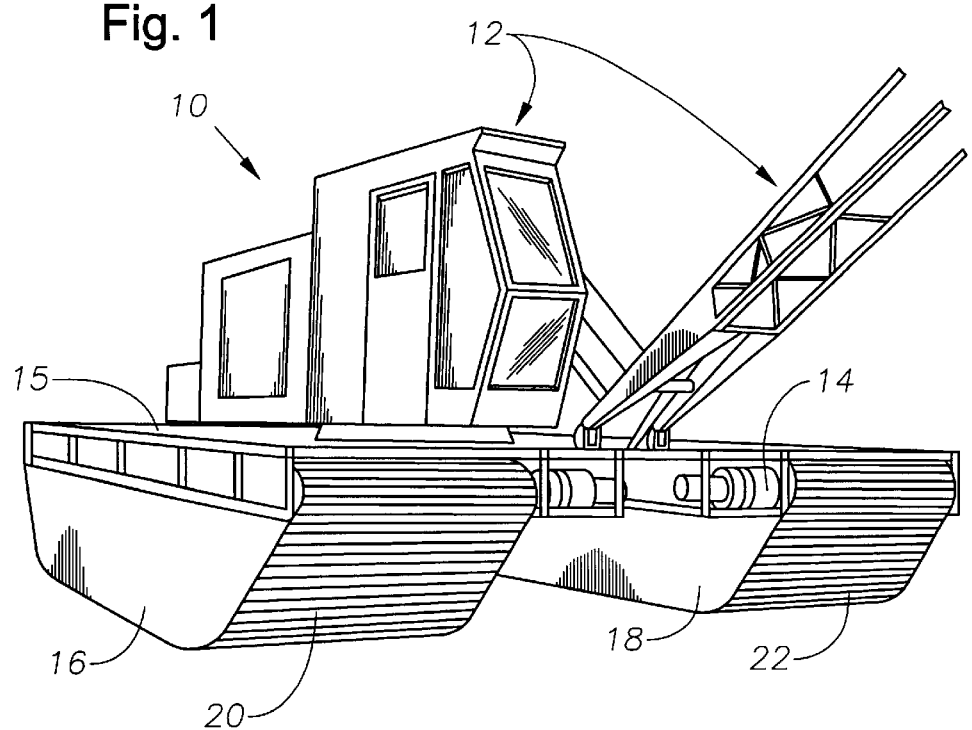
FIG. 1 is a perspective view of an amphibious vehicle.
Figure 2:
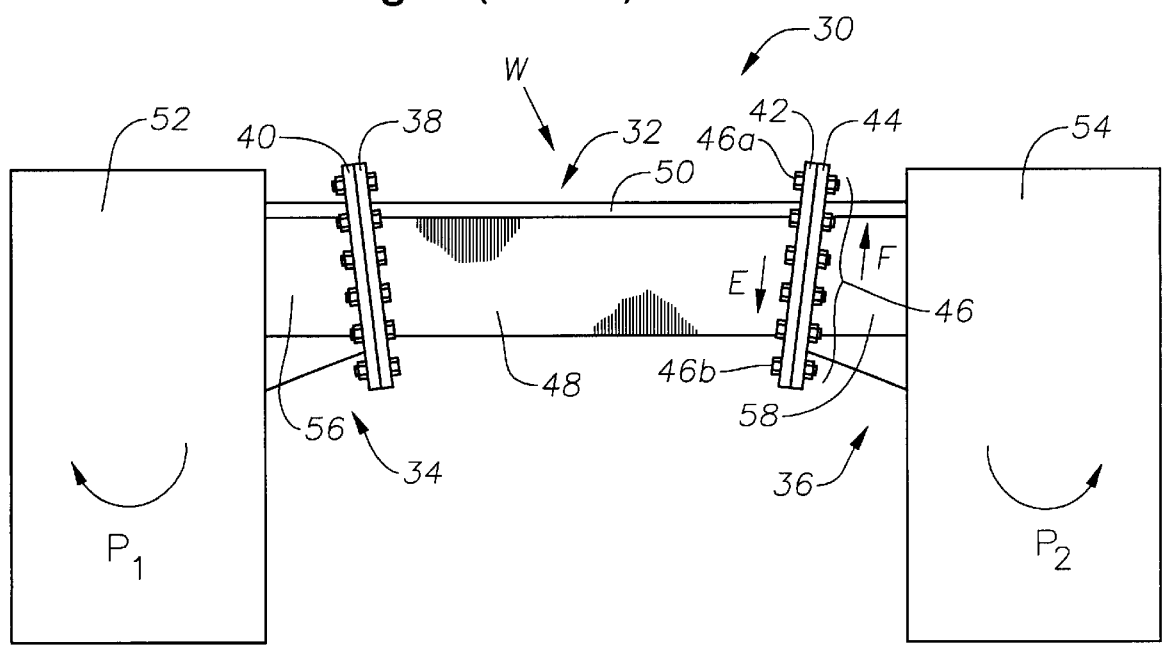
FIG. 2 is a schematic front view of a prior art chassis for an amphibious vehicle such as shown in FIG. 1.
Figure 4:
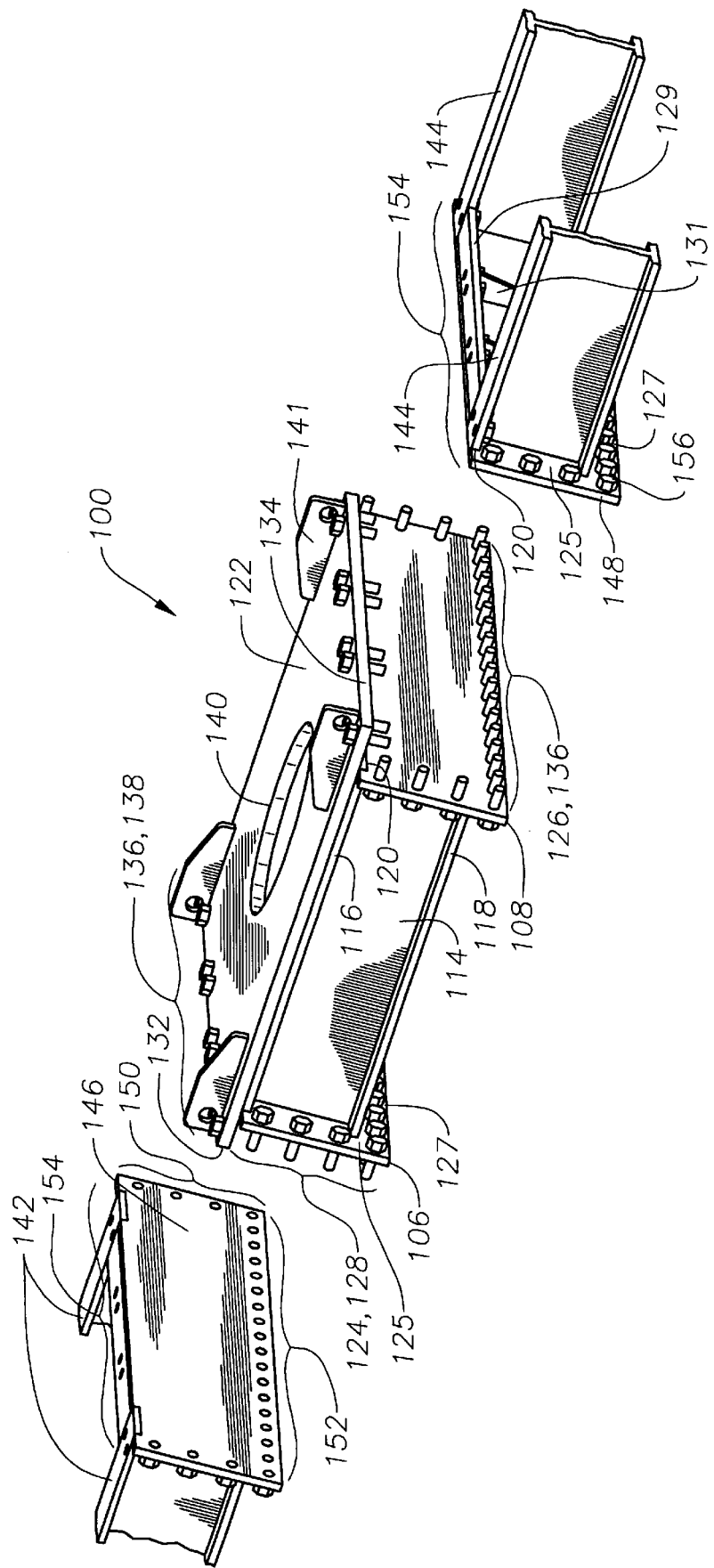
FIG. 4 is an exploded perspective schematic view of the chassis shown in FIG. 3.

Referring now to FIGS. 3 and 3A, an amphibious vehicle chassis 100, in accordance with a preferred embodiment of the present invention, is shown connecting two pontoons 102, 104. Chassis 100 provides a deck or platform whereupon a piece of heavy machinery, such as an excavator or boom crane, may be mounted. Chassis 100 preferably includes a pair of longitudinal beams 110, 112, such as I-beams. Although I-beams are shown, it should be understood that a wide assortment of structural members including, but not limited to, channel beams, square or round tubing, and plate steel weldments may be used. The I-beams 110, 112 form vertical webs 114 with horizontal portions 116, 118 on the top and bottom, respectively. End plates or flanges 106, 108 are affixed to each end of beams 111, 112. As best shown in FIG. 4, the ends of web 114 and bottom horizontal portion 118 abut end flanges 106, 108 and are affixed thereto such as by welding. The top horizontal portion 116 has a length greater than that of web 114 and bottom portion 118 and is received by a notch 120 in the upper end of end flanges 106, 108. Top portion 116 is affixed to end flanges 106, 108 such as by welding. End flanges 106, 108 are preferably parallel to each other, are perpendicular to longitudinal beams 110, 112, and have a plurality of holes therethrough as hereinafter described.

Chassis 100 also includes a top plate 122 which extends between longitudinal beams 110, 112 and covers top horizontal portions 116. Top plate 122 is fixedly coupled, such as by welding, to beams 110, 112 and to end flanges 106, 108 as shown. Top plate 122 has a preferred thickness in the range of 1 to 2 inches and is longer than longitudinal beams 110, 112. Top plate 122 includes extended portions 132, 134 that extend above, across and beyond each end flange 106, 108. Each extended portion 132, 134 includes a plurality of top holes 136 to accept bolts 138. Additionally, top plate 122 may include a cut-out 140 or mounting weldments 141 to accommodate various forms of heavy equipment to be carried, supported, and deployed by chassis 100 and pontoons 102, 104. Cut-out 140 is shown as being round in shape, but may be any geometry required to accommodate such equipment.

Referring now to FIG. 4, top plate 122 does not extend to the vertical side of end flanges 106, 108 thereby forming a border or access area 125 on each side of end flanges 106, 108. A bottom border or access area 127 is also provided on end flanges 106, 108. Holes 124 extend through vertical access areas 125 on each end plate 106, 108 of the preferred chassis 100 and holes 126 extend through the bottom access area 127 in each end plate 106, 108. Holes 124, 126 extend through end flanges 106, 108 approximately parallel to beams 110, 112. Holes 124, 126 are capable of accepting bolts 128, 130, respectively. Access areas 125, 127 allow access to the bolts 128, 130 and nuts 156 during the assembly and tightening operations.

Figure 5:
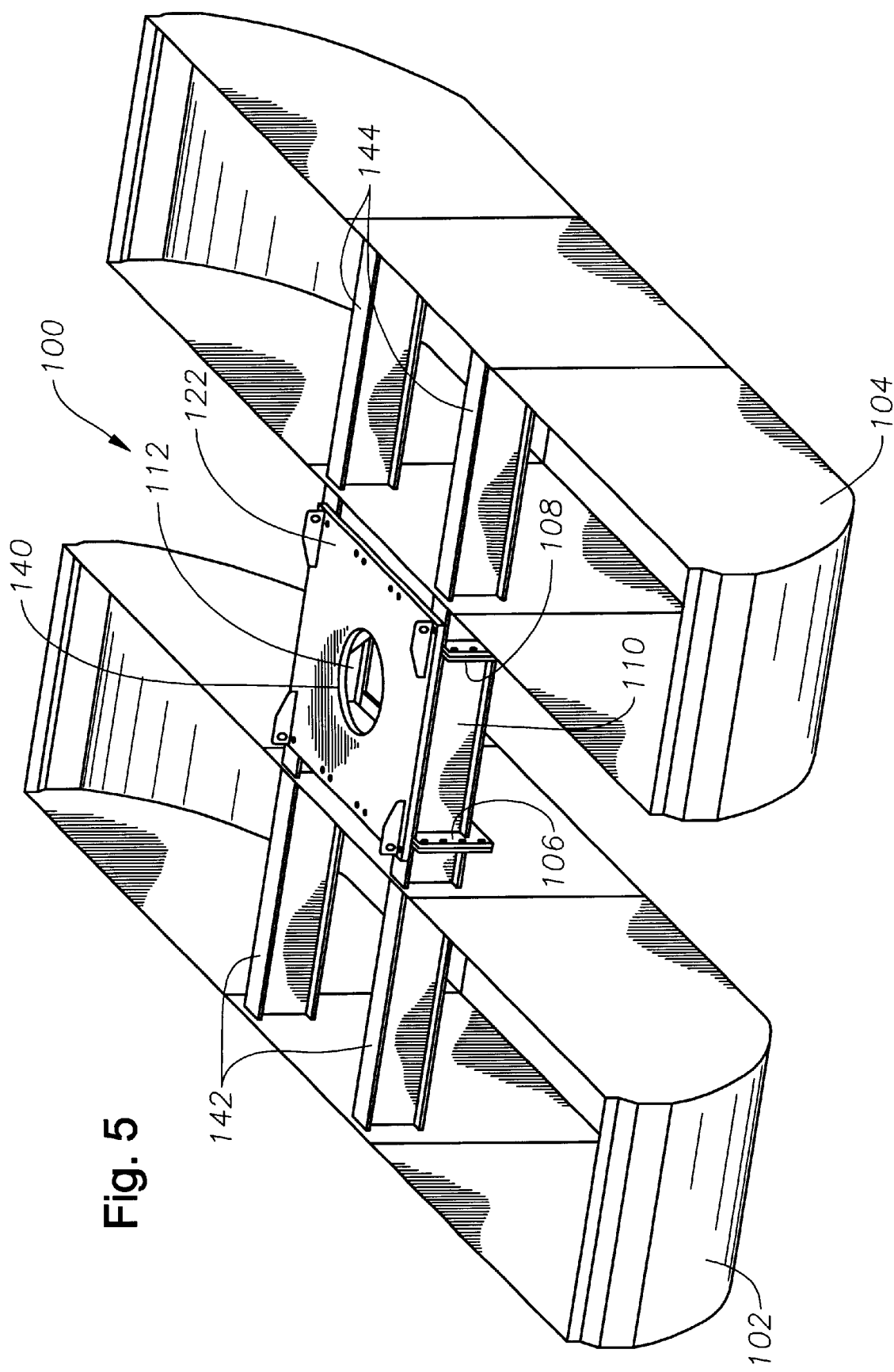
FIG. 5 is an assembled perspective schematic view of the chassis of FIG. 3 with pontoons attached.

Referring now to FIGS. 3–5 collectively, each of the pontoons 102, 104 includes a pair of beams 142, 144 which extend from the outboard side of the pontoon and through the inboard side of the pontoon so as to project interiorally of each pontoon 102, 104 in a cantilevered fashion for attachment to chassis 100. Support beams 142, 144, like longitudinal beams 110, 112, are preferably I-beams having vertical webs 114 with horizontal portions 116, 118 on the top and bottom, respectively. A mating flange 146, 148, that corresponds with respective end flanges 106, 108 of chassis 100, is affixed to each of the support beams 142, 144 such as by welding. The top horizontal portion 116 has a length greater than that of web 114 and bottom portion 118 forming a tine which is received by a notch 120 in the upper end of mating flanges 146, 148. Top portion 116 is affixed to end flanges 146, 148, such as by welding. Mating flanges 146, 148 also form vertical access areas 125 and a bottom access area 127 for holes 150 in vertical access area 125 and holes 152 in bottom access area 127. A further support brace 129 extends between top portions 116 and upper holes 154 that align with corresponding holes 138 in chassis 100. Additional braces 131 may also be attached to the bottom of support brace 129 and the outboard side of mating flanges 146, 148. Upper holes 154 may be located on each side of braces 131 at support brace 129.

In the assembly of the chassis 100 to the pontoons 102, 104, flanges 146, 106 and 148, 108 are juxtaposed with extended portions 132, 134 extending over support braces 129 at mating flanges 146, 148, respectively. Flange 106 is properly aligned with flange 146 such that horizontal holes 126, 152, vertical holes 124, 150, and top holes 136, 154 are aligned with each other. Likewise, flange 108 is aligned with flange 148 such that horizontal holes 126, 152, vertical holes 124, 150, and top holes 136, 154 are aligned with respect to each other. Once flanges 106, 108 of chassis 100 are aligned with corresponding flanges 146, 148 of support beams 142, 144, respectively, bolts 128, 130, and 138 are inserted through holes 126, 152, holes 124, 150, and holes 136, 154 respectively. Bolts 128, 130, and 138 are thereafter secured using nuts 156 which are then tightened to a predetermined torque to achieve the desired mating pre-load.

The presence of extended portions 132, 134 allows chassis 100 to prevent shear stress from acting on bolts 128, 130 by providing additional support for the normal and bending forces experienced by chassis 100. Extended portions 132, 134 also add to the robustness of chassis 100 by restricting the movement of flanges 106, 146 and 108, 148 with respect to each other. Additionally, the top portion 116 of longitudinal beams 110, 112 and support beams 142, 144 resting in notches 120 of flanges 106, 108, 146, 148 also provide additional support for the normal and bending forces experienced by chassis 100. Bolts 128, 130 will not experience the magnitude of shear that is experienced by the bolts of prior art chassises. Bending moments and normal forces created by the "flotation" of pontoons 102, 104 will be resisted by the extended portions 132, 134 of top plate 122 and the top portion 116 of longitudinal beams 110, 112 and support beams 142, 144 resting in notches 120 of flanges 106, 108, 146, 148 to prevent the loosening or partial failure of the connection.

Instead of relying on the shear strength of bolts, chassis 100, in accordance with a preferred embodiment of the present invention, relies on the shear strength of the thickness of top plate 122. As top plate 122 is preferably constructed as a steel sheet of substantial thickness, durability and longevity of chassis 100 is increased. Furthermore, the increased robustness of the chassis 100 of the preferred embodiment of the present invention enables larger equipment and heavier materials to be placed on top of their structures. Larger capacities enable fewer trips to be required when transporting material or personnel and allow heavier equipment to perform excavation tasks.

By increasing longevity and durability of chassis 100, marsh vehicles will be capable of remaining in service longer and can carry larger payloads. Improvements in service time and capability enable construction and demolition crews to work more efficiently and more cost effectively in environments that would otherwise seem unworkable. A marsh vehicle that is less susceptible to chassis failure at high loads can be deployed to remote locations with less support and repair equipment. By increasing the capacity of the vehicles and by reducing the amount of support equipment required, a more economical solution to the problems of construction and demolition in marshy environments is presented.

While a preferred embodiment of the invention has been shown and described, modifications thereof can be made by one skilled in the art without departing from the spirit of the invention.

What is claimed is:

1. An apparatus for connecting adjacent flotation members, each having supports, comprising:
    at least one beam having opposite ends and sides with an end member affixed to each beam end;
    a plate member affixed to one of said opposite sides and having a length greater than said beam to form extension surfaces;
    said extension surfaces adapted to be connected to said supports on a first plane; and
    said end members adapted to be connected to said supports on a second plane.

2. The apparatus of claim 1 wherein said second plane is substantially perpendicular to said first plane.

3. The apparatus of claim 1 wherein said beam includes a web and at least one extending portion perpendicular to said web.

4. The apparatus of claim 3 wherein said extending portion is longer than said web to form a tine and said end members include a recess to receive said tine.

5. The apparatus of claim 1 wherein said end members project beyond said ends and at least one side of said beam to form an access area therearound having a plurality of apertures adapted to receive fasteners.

6. The apparatus of claim 1 wherein said extension surfaces include a plurality of apertures adapted to receive fasteners.

7. The apparatus of claim 1 wherein at least two beams are affixed to each end member.

8. The apparatus of claim 1 wherein said beam is a steel I-beam.

9. A chassis for an amphibious vehicle having adjacent pontoons with mounts extending therefrom, comprising:
    at least one structural member having at least one flange secured thereto;
    said flange adapted to connect to said pontoon mount;
    a mounting platform extending across said structural member beyond said flange and onto said pontoon mount to prohibit relative planar movement of said flange with respect to said pontoon mount.

10. The chassis of claim 9 wherein said structural member is positioned underneath said mounting platform and adapted to support equipment.

11. The chassis of claim 9 whereby said flange and said pontoon mount are secured by threaded fasteners.

12. The chassis of claim 11 wherein said threaded fasteners include high strength bolts and corresponding nuts.

13. A chassis to support an amphibious vehicle comprising:
    a mounting platform adapted to support heavy equipment;
    at least one structural member positioned underneath said mounting platform;

at least one flange secured to said structural member;

at least one flotation member forming a connection with said flange;

said connection adapted to transmit loads and bending moments from said flotation member to said structural member; and said mounting platform extending over top and beyond said connection to prohibit relative planar movement of said flange with respect to said flotation member.

14. The chassis of claim 13 wherein said connection transmits loads and bending moments from said mounting platform to said flotation member.

15. The chassis of claim 13 wherein said flotation member includes a pontoon.

16. The chassis of claim 15 wherein said pontoon includes an endless track mounted thereupon.

17. The chassis of claim 13 wherein said heavy equipment includes an excavator.

18. The chassis of claim 13 wherein said heavy equipment included a personnel carrier.

19. An amphibious vehicle for use over marshy terrain, comprising:

a structural frame having a plurality of mounting flanges;

a mounting platform extending across said structural frame and adapted to support heavy equipment;

said mounting flanges having flange faces which are substantially normal to the terrain;

a plurality of load distributors adapted to engage the terrain;

a plurality of mating flanges attached to each of said load distributors;

each of said mating flanges attached to a corresponding mounting flange to form a plurality of connections; and said mounting platform extending above and beyond each of said connections to prevent said mating flanges and said mounting flanges from moving with respect to each other.

20. The amphibious vehicle of claim 19 wherein said mounting flange is attached to a pair of structural members extending from one side of said load distributor and extending beyond another side of said load distributor.

21. The amphibious vehicle of claim 20 further including a brace extending between said structural members.

22. The amphibious vehicle of claim 20 wherein said structural member includes a web and at least one extending portion perpendicular to said web.

23. The amphibious vehicle of claim 22 wherein said extending portion is longer than said web to form a tine and said mating flanges include a recess to receive said tine.

24. The amphibious vehicle of claim 22 wherein said mating flanges project beyond at least one side of said structural member to form an access area therearound having a plurality of apertures adapted to receive fasteners.

25. The amphibious vehicle of claim 19 wherein said connections are reinforced by a plurality of threaded fasteners.

26. The amphibious vehicle of claim 19 wherein said load distributors include buoyant pontoons.

27. The amphibious vehicle of claim 26 wherein said buoyant pontoons include at least one endless track mounted thereupon to guide the vehicle over the terrain.

* * * * *